United States Patent [19]

Pedretti et al.

[11] Patent Number: 5,169,416
[45] Date of Patent: Dec. 8, 1992

[54] PROCESS FOR PREPARING MODIFIED POLY-(2,6-DIMETHYL-P-OXYPHENYLENE)

[75] Inventors: Ugo Pedretti; Alberto Gandini, both of Milan; Arnaldo Roggero, San Donato Milanese; Raffaello Sisto; Claudio Valentini, both of Rome; Amalia Assogna, Riano; Alessandro Stopponi, Monterotondo, all of Italy

[73] Assignees: Snam S.p.A.; Eniricerche S.p.A., both of Milan; Agip Petroli S.p.A., Rome, all of Italy

[21] Appl. No.: 623,100

[22] Filed: Dec. 6, 1990

[30] Foreign Application Priority Data

Dec. 12, 1989 [IT] Italy ................ 22662 A/89

[51] Int. Cl.$^5$ .................. B01D 53/22; B01D 71/70
[52] U.S. Cl. .................. 55/158; 525/390; 525/393
[58] Field of Search .................. 55/16, 68, 158; 525/390, 393, 396

[56] References Cited

U.S. PATENT DOCUMENTS

| | | | |
|---|---|---|---|
| 3,402,143 | 9/1968 | Hay | 525/393 X |
| 3,402,144 | 9/1968 | Hay | 525/390 |
| 3,417,053 | 12/1968 | Chalk | 525/393 |
| 3,522,326 | 7/1970 | Bostick et al. | 525/393 X |
| 4,521,224 | 6/1985 | Li | 55/16 |
| 4,530,703 | 7/1985 | Malon et al. | 55/16 |
| 4,586,939 | 5/1986 | Li | 55/16 |
| 4,596,860 | 6/1986 | Percec et al. | 55/16 X |
| 4,647,297 | 3/1987 | Zampini | 55/16 X |
| 4,686,131 | 8/1987 | Sugio et al. | 55/158 X |
| 4,746,476 | 5/1988 | Kohn | 55/16 X |
| 4,950,314 | 8/1990 | Yamada et al. | 55/16 X |

FOREIGN PATENT DOCUMENTS

| | | | |
|---|---|---|---|
| 0099187 | 1/1984 | European Pat. Off. | 55/158 |
| 0256530 | 2/1988 | European Pat. Off. | 55/158 |
| 0298531 | 1/1989 | European Pat. Off. | 55/158 |
| 61-018402 | 1/1986 | Japan | 55/158 |
| 61-249522 | 11/1986 | Japan | 55/158 |
| 62-030524 | 2/1987 | Japan | 55/158 |
| 62-110728 | 5/1987 | Japan | 55/158 |
| 63-080826 | 4/1988 | Japan | 55/158 |

*Primary Examiner*—Robert Spitzer
*Attorney, Agent, or Firm*—Shea & Gould

[57] ABSTRACT

A process for preparing a modified, amorphous poly-(2,6-dimethyl-p-oxyphenylene) (PPO) comprises:
(a) metalating PPO with a metalating agent, and
(b) functionalizing such a metalated PPO by reacting the PPO with a trialkylsilyl halide and/or ethylene oxide; and is characterized in that the reaction of metalation is carried out in an inert liquid vehicle which contains PPO in an at least partially suspended solid form, by operating under metalating conditions of gradually adding metalating agent to such a suspension, either continuously or as discrete portions. Depending on the functionalizing agents used, and on the sequence of addition thereof, the process makes it possible to obtain PPO polymers which are modified with trialkyl-silyl, hydroxyethylene and/or ethyleneoxytrialkyl-silyl functional groups. The modified PPO polymers are particularly suitable for preparing flat membranes, including asymmetrical membranes, for the separation of gas mixtures.

21 Claims, No Drawings

PROCESS FOR PREPARING MODIFIED POLY-(2,6-DIMETHYL-P-OXYPHENYLENE)

The present invention relates to an improved process for preparing a modified, amorphous poly-(2,6-dimethyl-poxyphenylene) (PPO) useful for preparing flat membranes, including asymmetrical membranes, for the separation of gas mixtures.

Gas-permeable, polymeric membranes for use in the separation of gas mixtures are known in the art. Among them, for instance, those are comprised, which are described by S. A. Stern, ACHEMA 1985, Plenary Lecture, and by H. B. Hopfenberg and V. T. Stannet in "Material Science of Synthetic Membranes", ACS Symposium, Series N. 269, Chapter 2.

Among the useful polymers for the intended purpose, poly-(2,6-dimethyl-p-oxy-phenylene) (called in short form "PPO" in the following) is endowed with a good selectivity for gases, but shows a poor permeability to them. Therefore, modified PPO's have been proposed in the art, which should desirably be endowed with good permeability and selectivity characteristics in the separation of gas mixtures, and should also be easily transformed into membranes, in particular asymmetrical membranes. In particular, PPO was modified in most cases by the introduction of functional groups, such as, e.g., trialkyl-silyl and/or hydroxyethylene groups (U.S. Pat. No. 4,596,860, U.S. Pat. No. 5,019,631 and U.S. Ser. No. 550,864), and ethyleneoxy-trialkylsilyl groups (copending patent application to the same Applicant's name).

The processes adopted in the prior art to functionalize PPO normally consist of a step of metalation of PPO to yield a metalated PPO, followed by a step of reaction of metalated PPO with the suitable functionalizing agent. In particular the step of metalation is carried out, according to the technique known from the prior art, with PPO being dissolved in an inert solvent normally selected from the group consisting of benzene, toluene, xylene, tetrahydrofuran, and the like. Operating on PPO in solution basically derived from the need of uniformly distributing the metal throughout PPO, in order to have eventually a modified PPO with a uniform distribution of functional groups.

Unfortunately, these processes in solution suffer from drawbacks, above all deriving from the poor solubility of PPO in the suitable solvents. Such a solubility is in fact of the order of from 2 to 4 grams per each 100 ml of solvent under the conditions under which the metalation is carried out. The consequence is that the process is onerous and is not attractive for a practical implementation at the commercial level.

The present Applicant found now according to the present invention that PPO can be uniformly metalated by operating in a liquid, inert reaction medium containing PPO, at least partially, in a suspended, solid form and with the metalating agent being gradually fed to such suspension, either continuously or as discrete portions.

In particular, the process according to the present invention makes it possible PPO suspensions with high solids content to be metalated, with the problems which affect the prior art, as briefly mentioned hereinabove, being hence solved.

In accordance with the above, the present invention relates to a process for preparing modified, amorphous poly-(2,6-dimethyl-p-oxyphenylene) (PPO), which process comprises:
(a) metalating PPO by a metalating agent, and
(b) functionalizing such a metalated PPO by the reaction with a halo-trialkylsilane and/or ethylene oxide; and is characterized in that the reaction of metalation is carried out in an inert liquid vehicle which contains PPO in at least partially suspended solid form, by operating under metalating conditions and gradually adding said metalating agent to such a suspension, either continuously or as discrete portions.

The PPO which is submitted to the process according to the present invention is a well-known polymer, generally having a weight average molecular weight comprised within the range of from about 10,000 to about 80,000, with values of polydispersivity (i.e., the ratio of the weight average molecular weight to the number average molecular weight) comprised within the range of from about 1.4 to about 4.5. It is obtained in the art by the oxidative polymerization of 2,6-xylenol, in the presence of a catalyst, preferably selected from among copper complex catalysts.

According to the present invention, the metallation of such a PPO is carried out with the polymer being at least partially suspended in an inert organic solvent. Inert organic solvents suitable for the intended purpose are selected in general from the group consisting of aliphatic, cycloaliphatic or aromatic liquid hydrocarbons, ethers and cyclic ethers. Examples are benzene, toluene, xylene and tetrahydrofuran. According to the present invention, a suspension is prepared, containing at least 5 parts by weight, and up to about 30 parts by weight and preferably from 10 to 15 parts by weight of PPO per each 100 parts by weight of the selected solvent. Under these conditions, most PPO is in solid form, suspended in the solvent, and the metalating agent is gradually added to this suspension, either continuously, or as discrete portions.

The metalating agent useful for the intended purpose can be an alkali metal-alkyl, or an alkali metal hydride or alkali metal amide and preferably a $(C_1-C_{12})$-alkyllithium. Preferably, the metalating agent is n-butyllithium. The step of metalation of PPO is carried out at a temperature comprised within the range of from $-30°$ C. to $80°$ C., and preferably at room temperature (20°-25° C.). The ratio of the moles of the metalating agent to the monomer units (2,3-dimethyl-p-oxy-phenylene) contained in PPO depends on the desired extent of metalation, and is generally comprised within the range of from 0.2:1 to 1:1.

For the purposes of the instant invention, it is of basic importance that the metalating agent is gradually added to the suspension of PPO in the organic solvent. In particular, such an addition should be carried out during a time of, or longer than, about 15 minutes, and preferably within a time of from 20 to 45 minutes. The same addition may take place either continuously or as discrete portions during the metalation reaction. Futhermore, the metalation can be carried out in the presence of an activator, normally selected from the group consisting of tetramethyl-ethylene-diamine, potassium tert.-butoxide and diazabicyclo-octane. When an activator is used, the total amount of the latter can be added at the beginning of the metalation reaction, and said amount should be such as to have a molar ratio of the total metalating agent to the activator comprised within the range of from 1:0.5 to 1:1.

By operating in that way, a uniformly metalated PPO is obtained which can be transformed, by functionalization with suitable functionalizing agents, into a modified PPO, useful for producing separation membranes for gas mixtures. One should observe here that if the total amount of the metalating agent is added to the suspension of PPO soon at the beginning of the reaction of metalation, a metalated PPO is still obtained, but such a PPO, once functionalized, cannot be converted into membranes, or it will produce membranes which are unsuitable for the separation of gas mixtures.

Without desiring to be bound by any particular theories, the present applicant thinks that the good performance of the metalation operations according to the present invention is achieved as follows.

When a dispersion of PPO in the solvent is prepared, a small amount of PPO gets dissolved in the same solvent, as a function of its values of solubility at the temperature at which one operates. When the metalating agent is added to the suspension, said metalating agent essentially reacts with the dissolved PPO, producing the corresponding, poorly soluble, metalated PPO, which precipitates and enables a further amount of suspended PPO to get dissolved. In that way, the gradual addition of the metalating agent makes it possible a gradual reaction to take place with PPO which is dissolved as the reaction proceeds, and eventually makes it possible a uniformly metalated PPO to be obtained.

The metalated PPO obtained according to the process of the present invention can be functionalized by reacting it with suitable reactants, and preferably with a halo-trialkyl-silane and/or ethylene oxide. In particular, from the reaction with halo-trialkyl-silane a modified PPO is formed which contains trialkyl-silyl moieties

[—Si(R'R"R''')]

on its rings and/or methyl groups, i.e., a PPO containing the units:

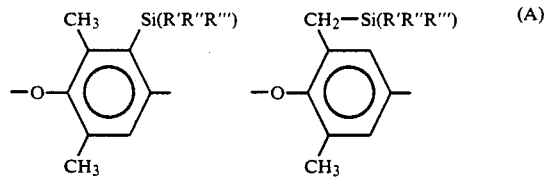
(A)

in which: R', R" and R''' independently represent an either linear or branched alkyl group containing from 1 to 4 carbon atoms, and preferably the methyl group.

When the metalated PPO is reacted with ethylene oxide, a modified PPO is obtained which contains hydroxyethylene moieties

(CH₂—CH₂—OH)

on its rings and/or methyl groups, i.e., a PPO containing the units:

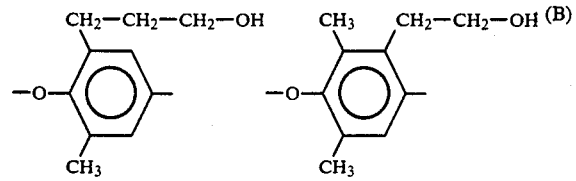
(B)

Obviously, a double-modified PPO [i.e., a PPO both containing (A) units and (B) units] can be obtained by causing metalated PPO to react, in succession, with a halo-trialkyl-silane and ethylene oxide.

A further possible modification can be obtained by causing metalated PPO to react first with ethylene oxide and then with a trialkyl-silyl-halide. In this case, a PPO can be obtained which, besides containing (A) and (B) units, additionally bears units containing an ethyleneoxy-trialkyl-silyl unit

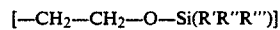
[—CH₂—CH₂—O—Si(R'R"R''')]

on its methyl and/or ring moieties, i.e., a PPO containing

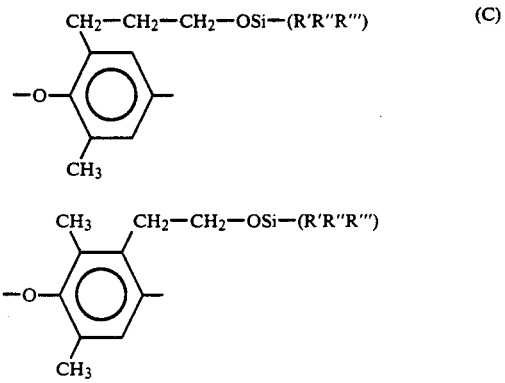
(C)

units.

The reaction between metalated PPO and ethylene oxide is usually carried out by feeding ethylene oxide to metalated PPO, suspended in the same organic solvent used for the metalation step, and operating at a temperature comprised within the range of from −30° C. to 80° C., preferably at room temperature (20°-25° C.) and during a time of from 0.5 to 30 minutes, and preferably of the order of 1–5 minutes.

In a similar way, the reaction of metalated PPO and halo-trialkyl-silane is carried out at a temperature comprised within the range of from 10° C. to 80° C., preferably at room temperature (20°-25° C.) and during a time of from 0.5 to 4 hours, and preferably of the order of 2 hours.

In the reaction of functionalization, the functionalizing agents will be used in such amounts as to cause the metalated centres of PPO to react to a substantially complete extent.

The functionalized PPO obtained according to the process of the present invention will generally contain from 25 to 70 functionalized units of (A), (B) and/or (C) kind, as defined above, per each 100 total units.

The modified PPO, obtained as defined above, can be separated from the reaction mixture by the usual techniques. It can be then submitted to purification treatments. Such a modified PPO is an amorphous solid product with a glass transition temperature (Tg) comprised within the range of from 170° to 220° C., and can be transformed into a homogeneus flat membrane or an asymmetrical flat membrane, in particular by the phase-reversal technique, by using an aqueous coagulating medium. The so obtained membranes are permeable and selective in the processes of separation of gas mixtures, such as, e.g., the gas mixtures containing such constituents as carbon dioxide, methane, oxygen and nitrogen.

The following experimental examples are reported to illustrate the present invention in greater detail.

EXAMPLE 1

An apparatus consisting of a jacketed glass reactor of 3,000 ml of capacity, equipped with mechanical stirring means, loading funnel, thermometer and pressure switch and feed and discharge ways, is used. 1,300 ml of tetrahydrofuran and 130 g of PPO (1.08 mol, with reference to the monomer units of 2,5-dimethyl-p-oxyphenylene present in PPO) are charged to the reactor. The PPO used for this test shows the following characteristics: weight average molecular weight 42,000 g/mol; ratio of the weight average molecular weight to the number average molecular weight (Mw/Mn) 2.5; intrinsic viscosity (at 25° C., in chloroform) 0.5 dl/g; glass transition temperature (Tg) 221° C. The so obtained suspension is adjusted at the controlled temperature of 25° C., and then n-butyl-lithium (34.56 g; 541 mmol) is added. The above amount of n-butyl-lithium is added as 4 portions of 8.64 g (0.135 mol) each, with an addition time of 3 minutes per each portion, and with an interval of 5 minutes between two successive portions. The total metalation time is of approximately 30 minutes.

Ethylene oxide is then added in an amount of 23.76 g (0.54 mol) to the suspension of metalated PPO, and the reaction is allowed to proceed for 2 hours at the temperature of 25° C. At the end of this period, the suspension is transferred to a stripper, in which the solvent is removed by a steam stream. The functionalized polymer is then dried at 80° C. in a vacuum oven.

In following Table 1, the metalation and functionalization conditions of PPO are reported. In particular, in this Table the millimoles of lithium-n-butyl used, the ratio of the moles of n-butyl-lithium to the number of monomer units of PPO (LiR/PPO), the metalation temperature (T'), the total time for n-butyl-lithium addition (t'), the metalated PPO-ethylene oxide reaction temperature (T'') and the time needed by this reaction (t'') are reported.

EXAMPLE 2

The process is carried out as in Example 1, with a ratio of the moles of n-butyl-lithium to the monomer units of PPO of 0.8:1. The results are reported in Table 1.

EXAMPLE 3

The process is carried out as in Example 1, with a ratio of the moles of n-butyl-lithium to the monomer units of PPO of 1:1. The results are reported in Table 1.

TABLE 1

| Example N. | LiR (mmoles) | LiR/ PPO | T' (deg C.) | t' (min) | T'' (deg C.) | t'' (min) |
|---|---|---|---|---|---|---|
| 1 | 541 | 0.5 | 25 | 30 | 25 | 60 |
| 2 | 866 | 0.8 | 25 | 45 | 25 | 120 |
| 3 | 1,083 | 1.0 | 25 | 30 | 25 | 120 |

In following Table 2, the characteristics of modified PPO obtained in Examples from 1 to 3 are reported. Such characteristics were determined by $^1$H-N.M.R. spectroscopy on the basis of the signals to be attributed to the protons of the several structures present in the polymer, deriving from introduced functional groups. More particularly, in said Table 2 the columns headed "Methyl (mol %)" and "Ring (mole %)" report the percentages of hydroxyethylene functionality (—CH$_2$—CH$_2$—OH) respectively bonded to the methyl group and to the benzene ring of 2,3-dimethyl-p-oxyphenylene; the column headed "Total (mol %)" reports the total percentages of functionalized monomeric units; and the column headed "Tg" reports the glass transition temperature of modified PPO polymers obtained.

TABLE 2

| Example N. | Methyl (mol %) | Ring (mol %) | Total (mol %) | Tg (deg C.) |
|---|---|---|---|---|
| 1 | 22.2 | 7.5 | 29.7 | 202 |
| 2 | 35.8 | 15.7 | 51.5 | 203 |
| 3 | 36.6 | 18.9 | 55.5 | 206 |

EXAMPLE 4

Samples of 1.5 g of modified PPO obtained in Examples from 1 to 3 are dissolved with slight stirring in a mixture constituted by 7.5 ml of chloroform and 0.5 ml of methyl alcohol, by operating at room temperature. When dissolution of polymer is complete, the solution is left standing for about 15 minutes, then is spread on a glass sheet and the layer thickness is adjusted to a constant value by a Gardner blade device (Pacific Scientific Gardner/Neotec Instrument Division) with an air gap of 15 mils, according to ASTM D-823-53 (1970) and according to D-823 procedure, to prepare the membrane for the test. Most solvent mixture is allowed to slowly evaporate at room temperature, with the glass sheet being first placed for 15 minutes under a glass bell whose atmosphere is saturated with chloroform vapours, and then for a further 15 minutes under an air stream under a hood equipped with air suction means. The last solvent traces are removed in a vacuum oven (80° C., 16 mm$_{Hg}$) for approximately 2 hours. The polymeric film is separated from the glass sheet by dipping said glass sheet in water. The polymeric film is then dried between two sheets of filter paper and is finally desiccated in a vacuum oven. From the film, a circular portion of 11 cm of diameter is cut, to be submitted to the test for permeability.

In Table 3, the coefficients of permeability of the polymeric films for carbon dioxide, methane, oxygen and nitrogen are reported. The values of these coefficients are obtained by testing the polymeric films for their permeability by the LYSSY GPM 200 permeameter. The measurement is carried out at the temperature of 35° C. and with a difference of partial pressure of permeant gas of 76 cm$_{Hg}$. In Table 3 the value of the thickness of tested polymeric films is reported, expressed as micrometers. Such a thickness is obtained by measuring the thickness of the film with a comparator, in 20 equidistant points and then computing the mathematical average of the readings.

In Table 3, also the selectivity values:

Alpha 1 = p(O$_2$)/p(N$_2$)

and

Alpha 2 = P(CO$_2$)/p(CH$_4$)

are reported.

TABLE 3

| Membrane Example N. | Thickness (μm) | P(CO$_2$) | P(CH$_4$) | P(O$_2$) | P(N$_2$) | Alpha 1 | Alpha 2 |
| | | ($10^{-10}$ STP · cc/cm$^2$ · sec · cm Hg) | | | | | |
|---|---|---|---|---|---|---|---|
| 1 | 41.4 ± 1.2 | 29.7 | 2.3 | 6.6 | 2.0 | 13.0 | 3.3 |
| 2 | 40.8 ± 1.8 | 25.3 | 1.6 | 4.9 | 1.3 | 15.8 | 3.7 |
| 3 | 45.8 ± 2.1 | 24.0 | 1.2 | 4.8 | 1.2 | 20.0 | 4.0 |

EXAMPLE 5

The modified PPO obtained in Example 3 is converted into an asymmetrical membrane by the phase-reversal technique. More particularly, solutions of modified PPO of concentrations of 25% and 30% (weight/weight) in 1-formyl-piperidine are prepared. The solution is prepared at room temperature by adding small successive portion of the polymer to the solvent. When the polymer is completely dissolved, an aliquot of the solution is drawn and applied as a layer to a glass sheet by using a CAMAG blade spreader with a fixed free air gap of 300 micrometers. The asymmetrical membrane is prepared by slowly and continuously sliding the glass sheet under the spreader in such a way, as to obtain a complete and uniform distribution of the solution. After a delay time comprised within the range of from 2 to 5 minutes, the sheet is charged to a coagulation bath constituted by bidistilled water at room temperature, inside which the phase reversal and consequently the formation of the asymmetrical membrane is accomplished. The membrane, once formed, is left inside the bath for a time of about 3 hours. It is then washed with bidistilled water and finally is dried at 30° C.

A portion of approximately 3×3 cm of size of the asymmetrical membrane is bonded between 2 aluminum foils of 11×11 cm of size. At the centre of each foil a bore of 1.6 cm of diameter had been previously made. The two bores in the two foils correspond to each other, so a free through-opening of 2 cm$^2$ of surface area is left. The so obtained specimen is mounted inside the LYSSY GPM 200 permeameter and is used to measure the permeance (gas flow rate/pressure unit) for carbon dioxide, methane, oxygen and nitrogen at the temperature of 35° C. and under a permeant gas pressure of 76 cm$_{Hg}$. The thickness of the layer active in gas separation (skin) can be computed, for each gas, as the ratio of the coefficient of permeability of modified PPO, measured on a dense and homogeneous film, to the permeance of the asymmetrical membrane showing the same selectivity as of its precursor polymer.

Two tests are carried out. In the first test, by operating with a solution at 25% (weight/weight) of modified PPO in 1-formyl-piperidine an asymmetrical membranes is obtained, which shows the following characteristics:

Total thickness: 98 micrometers
P(CO$_2$): 35.7 $10^{-6}$ STP.cc/cm$^2$.sec.cm$_{Hg}$
P(CH$_4$): 18.1 $10^{-6}$ STP.cc/cm$^2$.sec.cm$_{Hg}$
P(O$_2$): 20.2 $10^{-6}$ STP.cc/cm$^2$.sec.cm$_{Hg}$
P(N$_2$): 16.9 $10^{-6}$ STP.cc/cm$^2$.sec.cm$_{Hg}$
P(CO$_2$)/P(CH$_4$): 2.0
P(O$_2$)/P(N$_2$): 1.2.

In the second test, a solution at 30% (weight/weight) is used, and the asymmetrical membrane displays the following characteristics:

Total thickness: 107 micrometers
P(CO$_2$): 3.62 $10^{-6}$ STP.cc/cm$^2$.sec.cm$_{Hg}$
P(CH$_4$): 0.19 $10^{-6}$ STP.cc/cm$^2$.sec.cm$_{Hg}$
P(O$_2$): 0.70 $10^{-6}$ STP.cc/cm$^2$.sec.cm$_{Hg}$
P(N$_2$): 0.18 $10^{-6}$ STP.cc/cm$^2$.sec.cm$_{Hg}$
P(CO$_2$)/P(CH$_4$): 19.1
P(O$_2$)/P(N$_2$): 3.9
Skin thickness: 6.6 micrometers.

EXAMPLE 6

Two tests of metalation of PPO, reaction of metalated PPO with ethylene oxide and transformation of the so functionalized PPO into a membrane are carried out.

In the first test (Test I) the metalating agent is slowly added. In the second test (Test II) the whole amount of metalating agent is added at the beginning of the metalation reaction. As regards the other operations, the same procedures of the preceding examples are used. The results of these tests are reported in following Table 4.

TABLE 4

| Characteristics | Test II | Test I |
|---|---|---|
| LiR/PPO (during the reaction step) (functionalized PPO) | 1 | 1 |
| —CH$_2$—CH$_2$—OH (methyl) moles (%) | 33.5 | 36.6 |
| —CH$_2$—CH$_2$—OH (ring) moles (%) | 16.9 | 18.9 |
| —CH$_2$—CH$_2$—OH (total) moles (%) | 50.4 | 55.5 |
| Tg (°C.) | 212 | 206 |
| O.D. at 430 nm (colour)* | 0.70 | 0.20 |
| O.D. at 600 nm (colour)* | 1.20 | 0.15 |
| Viscosity (mPA · second)** | 900 | 170 |
| Density, g/ml | 1.16 | 1.13 |
| (Gas transport) | | |
| P(O$_2$) | 5.4 | 4.8 |
| P(N$_2$) | 2.2 | 1.2 |
| P(O$_2$)/P(N$_2$) | 2.5 | 4.0 |

From the above data, one can observe that the immediate addition of the whole amount of n-butyl-lithium to the dispersion of PPO in tetrahydrofuran, followed by the reaction with ethylene oxide (Test II) leads to the formation of a functionalized PPO, the degree of functionalization of which (N.M.R. determination) is comparable to that of test (I). The features which differentiate the two functionalized PPO polymers are the colour, the viscosity and, above all, the characteristics of gas transport by the membranes obtained from them.

We claim:
1. Process for preparing modified, amorphous poly(2,6-dimethyl-p-oxyphenylene) (PPO), which process comprises the steps of:
   (a) metalating PPO by a metalating agent, and
   (b) functionalizing such a metalated PPO by the reaction with a halo-trialkyl-silane and/or ethylene oxide, wherein the reaction of metalation is carried out in an inert liquid vehicle, which contains PPO in at least partially suspended solid form, under metalating conditions, and wherein the metalation is performed by gradually adding said metalating agent to the suspension either continuously or as discrete portions.
2. Process according to claim 1, wherein the metalation of PPO is carried out with the polymer being at least partially suspended in an inert, organic vehicle selected from the group consisting of aliphatic, cycloaliphatic, aromatic, etheric and cyclic etheric solvents.

3. Process according to claim 2, wherein said inert, organic vehicle is selected from the group consisting of benzene, toluene, xylene and tetrahydrofuran.

4. Process according to claim 1, wherein the metalating step (a) is carried out with a suspension containing at least 5 parts by weight and up to about 30 parts by weight of PPO per each 100 parts by weight of liquid vehicle.

5. Process according to claim 4, wherein the metalating step (a) is carried out with a suspension containing of from about 10 to about 15 parts by weight of PPO per each 100 parts by weight of liquid vehicle.

6. Process according to claim 1, wherein the metalating agent is an alkli metal-alkyl, an alkali metal hydride or an alkali metal amide, and the metalating step (a) of PPO is carried out at a temperature within the range of from $-30°$ C. to 80° C., with a ratio of the moles of the metalating agent to monomer units contained in PPO within the range of from 0.2:1 to 1:1.

7. Process according to claim 6, wherein the metalating agent is comprised of a ($C_1$-$C_{12}$)-alkyl lithium.

8. Process according to claim 7, wherein the metalating agent is comprised of N-butyl-lithium.

9. Process according to claim 6, wherein the metalating step (a) is carried out at a temperature within the range of from 20° C. to 25° C.

10. Process according to claim 6, wherein the PPO is comprised of monomer units of (2,3-dimethyl-p-oxyphenylene).

11. Process according to claim 1, wherein the addition of the metalating agent to the PPO suspension is carried out over the course of at least about 15 minutes.

12. Process according to claim 11, wherein the addition of the metalating agent to the PPO suspension is carried out over the course of from about 20 to about 45 minutes.

13. Process according to claim 1, wherein the metalated PPO is functionalized by means of reactions selected from the group consisting of sequential reaction with a halo-trialkylsilane and then with ethylene oxide, and the sequential reaction with ethylene oxide and then with a halo-trialkylsilane.

14. Process according to claim 13, wherein in the second sequential reaction the reaction of metalated PPO and ethylene oxide is carried out by feeding ethylene oxide to metalated PPO suspended in the same liquid vehicle used for the metallation step, and operating at a temperature within the range of from $-30°$ C. to 80° C., and over a course of time of from 0.5 to 30 minutes.

15. Process according to claim 14, wherein the reaction of metalated PPO and ethylene oxide is carried out at a temperature of from about 20° C. to about 25° C.

16. Process according to claim 14, wherein the reaction of metalated PPO and ethylene oxide is carried out over a time period of from about 1 to about 5 minutes.

17. Process according to claim 13, wherein the reaction of metalated PPO and trialkyl-silyl-halide is carried out at a temperature within the range of from 10° C. to 80° C., and over a course of time of from 0.5 to 4 hours.

18. Process according to claim 17, wherein the reaction of metalated PPO and tri-alkyl-silyl-halide is carried out over a course of time of about 2 hours.

19. Process according to claim 13, wherein the reaction of metalated PPO and tri-alkyl-silyl-halide is carried out at a temperature within the range of from about 20° C. to about 25° C.

20. Flat, homogeneous membranes for the separation of gas mixtures, comprising modified PPO obtained according to the process of any one of claims 1, 2, 3, 4, 6, 11, 13, 14 or 17.

21. Flat, asymmetrical membranes for the separation of gas mixtures comprising modified PPO obtained according to the process of any one of claims 1, 2, 3, 4, 6, 11, 13, 14 or 17.

* * * * *